(12) United States Patent
Lin et al.

(10) Patent No.: US 8,207,973 B2
(45) Date of Patent: Jun. 26, 2012

(54) SYSTEMS AND METHODS FOR CONTROL SIGNAL AND DATA TRANSMISSION BETWEEN VARIOUS TYPES OF ELECTRONIC MODULES

(75) Inventors: Chang-Fu Lin, Hsinchu (TW);
Shu-Wen Teng, Taipei (TW);
Cheng-Che Chen, Taipei County (TW);
Wei-Cheng Gu, Hsinchu (TW)

(73) Assignee: Mediatek Inc., Hsin-Chu (TW)

( * ) Notice: Subject to any disclaimer, the term of this patent is extended or adjusted under 35 U.S.C. 154(b) by 931 days.

(21) Appl. No.: 12/176,674

(22) Filed: Jul. 21, 2008

(65) Prior Publication Data
US 2009/0179905 A1    Jul. 16, 2009

Related U.S. Application Data

(60) Provisional application No. 61/020,414, filed on Jan. 11, 2008.

(51) Int. Cl.
*G09G 3/36* (2006.01)
*G09G 5/39* (2006.01)
*H04B 7/24* (2006.01)
*H04N 7/24* (2011.01)

(52) U.S. Cl. .......... 345/501; 345/87; 345/531; 345/553; 345/558; 455/39

(58) Field of Classification Search .................. None
See application file for complete search history.

(56) References Cited

U.S. PATENT DOCUMENTS

| | | | |
|---|---|---|---|
| 5,550,586 A | 8/1996 | Kudo et al. | |
| 6,664,970 B1 * | 12/2003 | Matsushita | 345/581 |
| 7,050,197 B1 | 5/2006 | Szumla et al. | |
| 7,174,406 B1 | 2/2007 | Abdallah et al. | |
| 2002/0171657 A1 | 11/2002 | Lavelle et al. | |
| 2003/0107656 A1 | 6/2003 | Ito et al. | |
| 2003/0107669 A1 | 6/2003 | Ito et al. | |
| 2003/0222998 A1 | 12/2003 | Yamauchi et al. | |
| 2004/0119844 A1 | 6/2004 | Aldrich et al. | |
| 2004/0125386 A1 | 7/2004 | Eom et al. | |
| 2005/0285961 A1 | 12/2005 | Kokubo et al. | |
| 2006/0181547 A1 | 8/2006 | Loo | |
| 2006/0182149 A1 | 8/2006 | Ramsdale | |
| 2006/0182411 A1 | 8/2006 | Loo | |

(Continued)

FOREIGN PATENT DOCUMENTS

CN    1525759 A    9/2004

(Continued)

OTHER PUBLICATIONS

English abstract of DE102005026436A1; pub. Dec. 14, 2006.

(Continued)

*Primary Examiner* — Kee M Tung
*Assistant Examiner* — Michelle Chin
(74) *Attorney, Agent, or Firm* — Thomas|Kayden

(57) ABSTRACT

An electronic device is disclosed. The electronic device comprises a transmitter, a converter, and a receiver. The transmitter transmits data and a control signal. The converter receives the control signal from the transmitter and converts the control signal. The receiver receives the data from the transmitter via a data bus isolated from the converter and receives the converted control signal from the converter. The data transmitted from the transmitter is directly electrically connected to the receiver.

25 Claims, 4 Drawing Sheets

U.S. PATENT DOCUMENTS

| | | |
|---|---|---|
| 2006/0184987 A1 | 8/2006 | Allen et al. |
| 2007/0233928 A1 | 10/2007 | Gough |
| 2008/0018742 A1 | 1/2008 | Hatano et al. |
| 2008/0068390 A1* | 3/2008 | Ishii et al. .................... 345/519 |
| 2009/0125663 A1 | 5/2009 | Schoegler |

FOREIGN PATENT DOCUMENTS

| | | |
|---|---|---|
| CN | 1878278 | 12/2006 |
| CN | 201044473 | 4/2008 |
| DE | 102005026436 A1 | 12/2006 |
| WO | WO 99/13637 | 3/1999 |

OTHER PUBLICATIONS

English abstract of CN1525759A; pub. Sep. 1, 2004.
English language translation of abstract of CN 201044473 (published Apr. 2, 2008).
English language translation of abstract of CN 1878278 (published Dec. 13, 2006).

* cited by examiner

SYSTEMS AND METHODS FOR CONTROL SIGNAL AND DATA TRANSMISSION BETWEEN VARIOUS TYPES OF ELECTRONIC MODULES

CROSS REFERENCE TO RELATED APPLICATIONS

This application claims the benefit of U.S. Provisional Application No. 61/020,414, filed on Jan. 11, 2008 and entitled "Systems and Methods for Control Signal and Data Transmission between Various Types of Electronic Modules". The entire contents of which are hereby incorporated by reference.

BACKGROUND OF THE INVENTION

1. Field of the Invention

The invention relates to an electronic device comprising multiple electronic modules, and more particularly to an electronic device capable of providing efficient data and control signal transmission between the electronic modules.

2. Description of the Related Art

Electronic devices such as mobile phones, digital cameras, digital recorders, personal digital assists (PDAs), or personal computers, are made up of an increasing amount of electronic modules, such as image modules, storage devices, display units, or others. Thus, integration of the various electronic modules has become a key issue for design of the highly integrated electronic devices.

FIG. 1 shows conventional data transmission between two electronic modules in a handheld device. A mobile phone 100 comprises a transmitter 102, a baseband chip 104, and a receiver 106. The baseband chip 104 comprises a transmitter controller 108, a first-in-first-out (FIFO) buffer 110, and a receiver controller 112. The transmitter 102 transmits data and control signals to the baseband chip 104 via the transmitter controller 108, and then the baseband chip 104 stores the data in the FIFO buffer 110. Finally, the baseband chip 104 transmits the stored data to the receiver 106 via the receiver controller 112. One disadvantage of conventional data transmission is that excessive processing resources are consumed when the data is moved from one module to another in the handheld device, such as computing capacity, buffer storage and protocol handling of different interface controllers. Thus, a need exists for an efficient system and method for signal transmission between various types of electronic modules.

BRIEF SUMMARY OF THE INVENTION

The invention provides an electronic device comprising a transmitter, a converter, and a receiver. The transmitter transmits data and a control signal. The converter receives the control signal from the transmitter and converts the control signal. The receiver receives the data from the transmitter via a data bus isolated from the converter and receives the converted control signal from the converter. The data transmitted from the transmitter is directly electrically connected to the receiver.

The invention provides another electronic device comprising a transmitter, an integrated chip, and a receiver. The transmitter transmits data and a control signal. The integrated chip comprises a converter configured to receive the control signal from the transmitter via a first I/O pin and convert the control signal. The receiver receives the data from the transmitter via a data bus on the outside of the integrated chip and receives the converted control signal from the converter via a second I/O pin.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
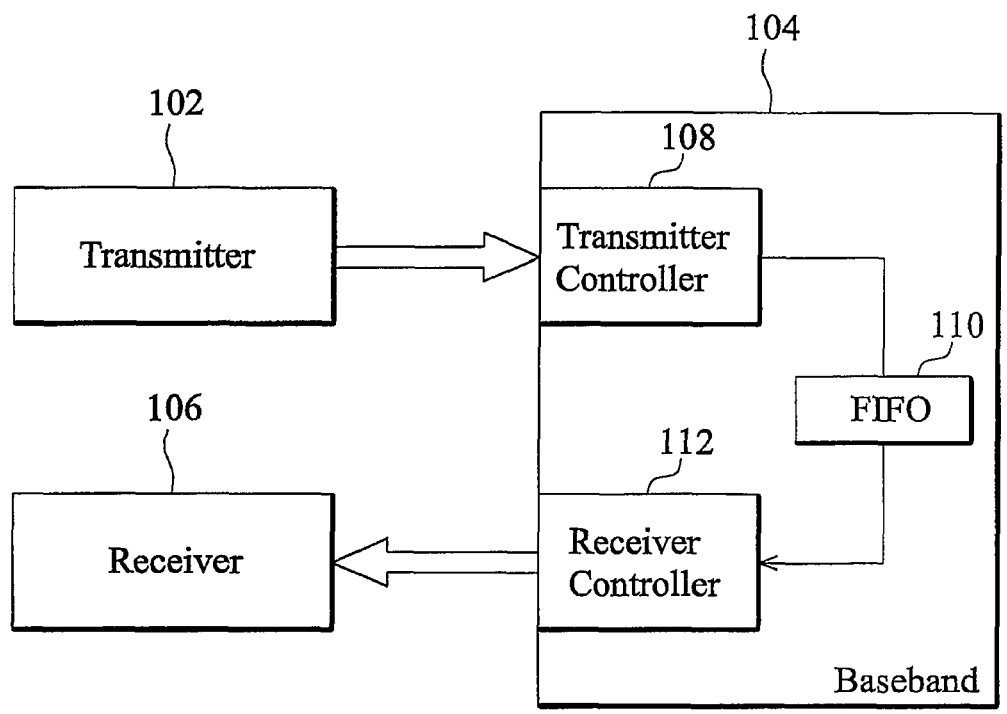
FIG. 1 shows conventional data transmission between two electronic modules in a handheld device.
Figure 2:
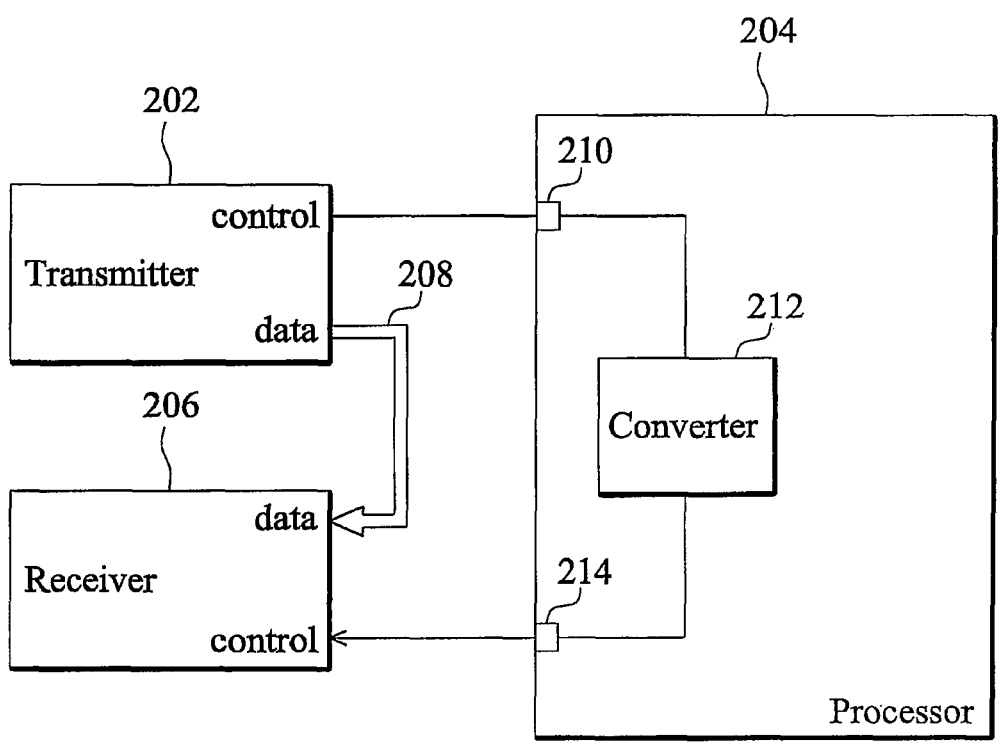
FIG. 2 is a diagram of an embodiment of hardware architecture for integrating two electronic modules in an electronic device according to the invention.

FIG. 2 is a diagram of an embodiment of hardware architecture for integrating two electronic modules in an electronic device according to the invention. The electronic device 200 may be a handheld device such as a mobile phone or a personal digital assistant (PDA), or a notebook or personal computer. The electronic device 200 may comprise a transmitter 202, a processor 204, and a receiver 206. A data terminal of the transmitter 202 is directly connected to a data terminal of the receiver 206 via a data bus 208 isolated from the processor 204, so as to directly transmit data from the transmitter 202 to the receiver 206. It is to be understood that the data content is not modified during data transmissions between the transmitter 202 and the receiver 206, i.e. the data transmitted from the transmitter 202 is directly and electrically connected to the receiver 206. The processor 204 may be an integrated chip (e.g., a baseband chip of a mobile phone) comprising a first I/O pin 210, a converter 212, and a second I/O pin 214. The converter 212 may receive the control signals issued from the transmitter 202 via the first I/O pin 210, convert the received control signals into control signals recognized by the receiver 206, and then issue the converted control signals to the receiver 206 via the second I/O pin 214. The receiver 206 may process the received data based on the converted control signals issued from the converter 212. In contrast with FIG. 1, the embodiment of the hardware architecture according to the invention consumes fewer resources and improves data transmission performance.

Figure 3:
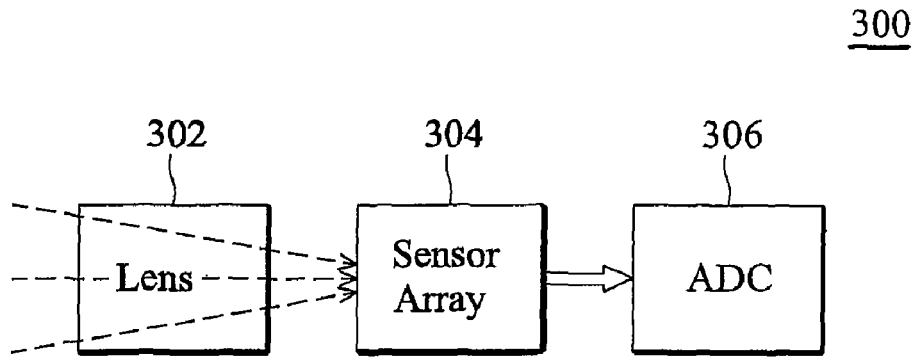
FIG. 3 is a diagram of an embodiment of hardware architecture of a camera module.
Figure 4:
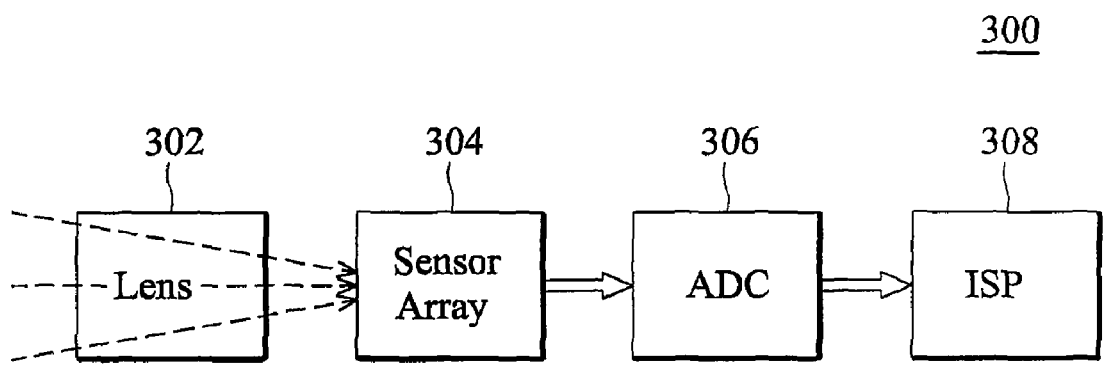
FIG. 4 is a diagram of an embodiment of hardware architecture of another camera module.

In an embodiment, the transmitter 202 of FIG. 2 may be an image providing module, such as an analog-to-digital converter (ADC) or an image signal processor (ISP) of a camera module. Referring to FIG. 3, an embodiment of a camera module 300 may contain lens 302, a sensor array 304, and an ADC 306. The lens 302 is an optical device with perfect or approximate axial symmetry which refracts light beams from objects to concentrate the light beams. The sensor array 304 receives the concentrated light beams and records color images corresponding to the light beams as intensities of red, green and blue, which are stored as variable (analog) charges. The sensor array 304 may be a charge-coupled device (CCD) or complementary metal-oxide-semiconductor (CMOS) sensor array. The variable charges may be converted into digital pixel data by the ADC 306. Moreover, the ADC 306 may generate control signals along with the pixel data, such as a horizontal sync (HSYNC) signal used to indicate valid pixel data of a frame line and a pixel clock (PXL_CLK) used to synchronize data transmission of each pixel data. In another embodiment, referring to FIG. 4, the camera module 300 may further comprise an image signal processor (ISP) 308. The ISP 308 may adjust contrast and detail of color images, and compress the pixel data for subsequent display and storage. In FIG. 4 the control signals HSYNC and PXL_CLK may be generated by the ADC 306 or the ISP 308.

Figure 5:
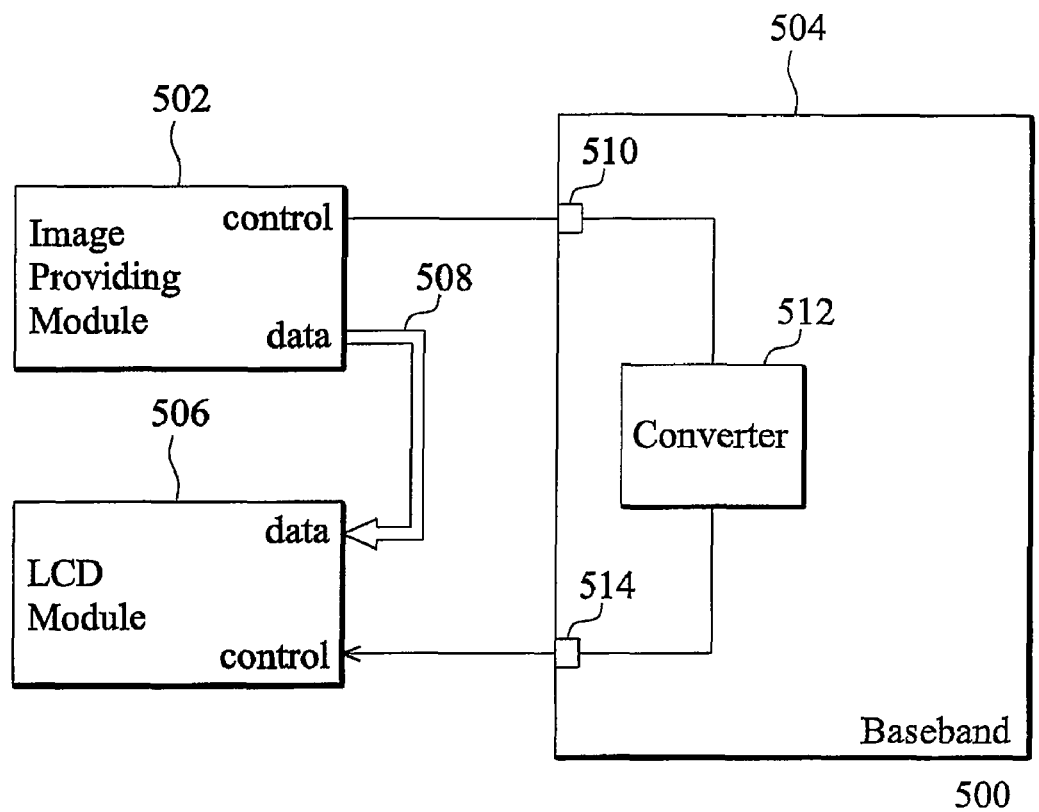
FIG. 5 is a diagram of an embodiment of hardware architecture for integrating an image providing module and a liquid crystal display (LCD) module in a mobile phone according to the invention.

FIG. 5 is a diagram of an embodiment of hardware architecture for integrating an image providing module and a liquid crystal display (LCD) module in a mobile phone according to the invention. The mobile phone 500 may comprise an image providing module 502, a baseband chip 504, and an LCD module 506. The image providing module 502 may be an ADC or an image signal processor of a camera module, which can generate image data (i.e. pixel data) and corresponding control signals. The image providing module 502 may generate control signals such as a horizontal sync (HSYNC) signal used to indicate valid pixel data of a frame line and a pixel clock (PXL_CLK) used to synchronize data transmission of the pixel data. A data terminal of the image providing module 502 is directly connected to a data terminal of the LCD module 506 via a data bus 508 disposed on the outside of the baseband chip 504, so as to directly transmit the image data from the image providing module 502 to the LCD module 506. It should be noted that the image data is transmitted from the image providing module 502 to the LCD module 506 without any data format conversion. The image data format may be an RGB format, a YUV (also referred as YCbCr) format, an index column (also referred as palette) format, or any other color format. The RGB format is an additive color model where red, green, and blue components are combined together in various ways to reproduce a broad array of colors. The color of each pixel therefore can be represented as three color components (r,g,b), wherein each component can vary from zero to a defined maximum value. The YUV (or YCbCr) format is another color model which can be linear transformed from the RGB format. Y is the luma component of a pixel, which is brightness or lightness. Cb and Cr are color difference components of a pixel, being blue minus luma (B-Y) and red minus luma (R-Y). The index column (or palette) format is a limited and fixed color selection typically standardized by some providers (e.g., the well-known Web colors for use with Internet browsers, or the Microsoft Windows default palette), and the color of a pixel can be represented by a color index referring to a predefined actual color value (e.g. RGB or YCbCr color value) in the palette. The baseband chip 504 may comprise a first I/O pin 510, a converter 512, and a second I/O pin 514. The converter 512 may receive the control signals issued from the image providing module 502 via the first I/O pin 510, convert the received control signals into control signals recognized by the LCD module 506, and then issue the converted control signals to the LCD module 506 via the second I/O pin 514. The LCD module 506 may process the received image data based on the converted control signals issued from the converter 512. The converted control signals may be a chip selection (CS) signal used to enable the LCD module 506 to latch on to the image data on the data bus 508, or a write strobe (WR) signal used to enable the LCD module 506 to store the pixel data in a line buffer (not shown) of the LCD module 506 to display the image on an LCD panel (not shown).

Figure 6:
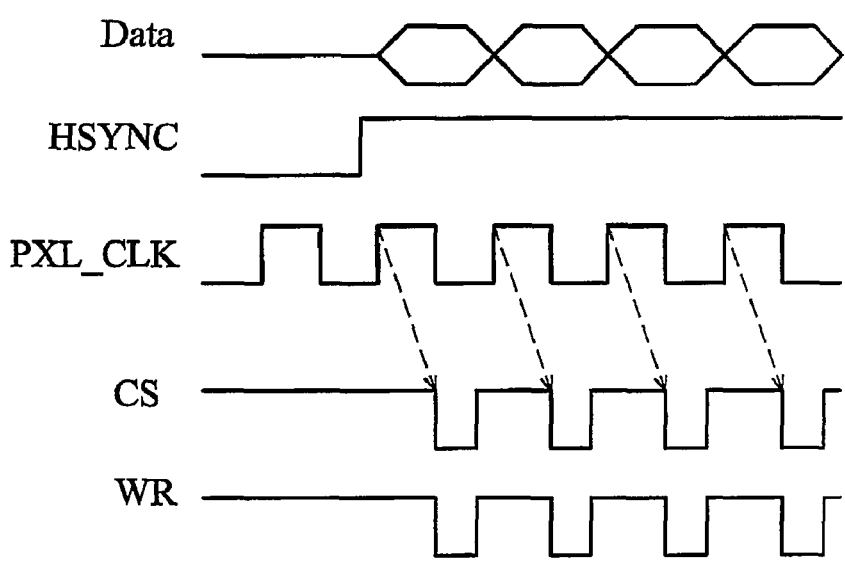
FIG. 6 shows exemplary control signal conversion between the image providing module and the LCD module in FIG. 5.

FIG. 6 shows exemplary control signal conversion between the image providing module 502 and the LCD module 506 in FIG. 5. Control signals HSYNC and PXL_CLK issued from the image providing module 502 are simply converted into control signals CS and WR to the LCD module 506. When the converter 512 detects that a signal HSYNC is at an active high (representing that pixel data of a frame line is being sent on the data bus 508) and a pixel clock PXL_CLK from the image providing module 502 is present, the converter 512 may generate and output control signals CS and WR to the LCD module 506 and each control signal CS or WR is within its corresponding pixel clock period, where the pixel clock period may be between two adjacent risings or failings of PXL_CLK depending on system requirements. Each pixel clock is utilized to synchronize data transmission of each pixel data on the data bus 508. Each chip selection or write strobe signal may be started later than a start of its corresponding pixel clock period. Those skilled in the art will appreciate that the image providing module 502 may generate a signal HSYNC at an active low to represent that the pixel data of a frame line is being sent on the data bus 508. Moreover, the pixel data from the image providing module 502 is simultaneously output to the data terminal of the LCD module 506 in order to display the images on the LCD panel. When detecting chip selection and write strobe signals CS and WR, the LCD module 506 latches on to the pixel data on the data bus 508 to display the pixel data on the LCD panel.

Figure 7:
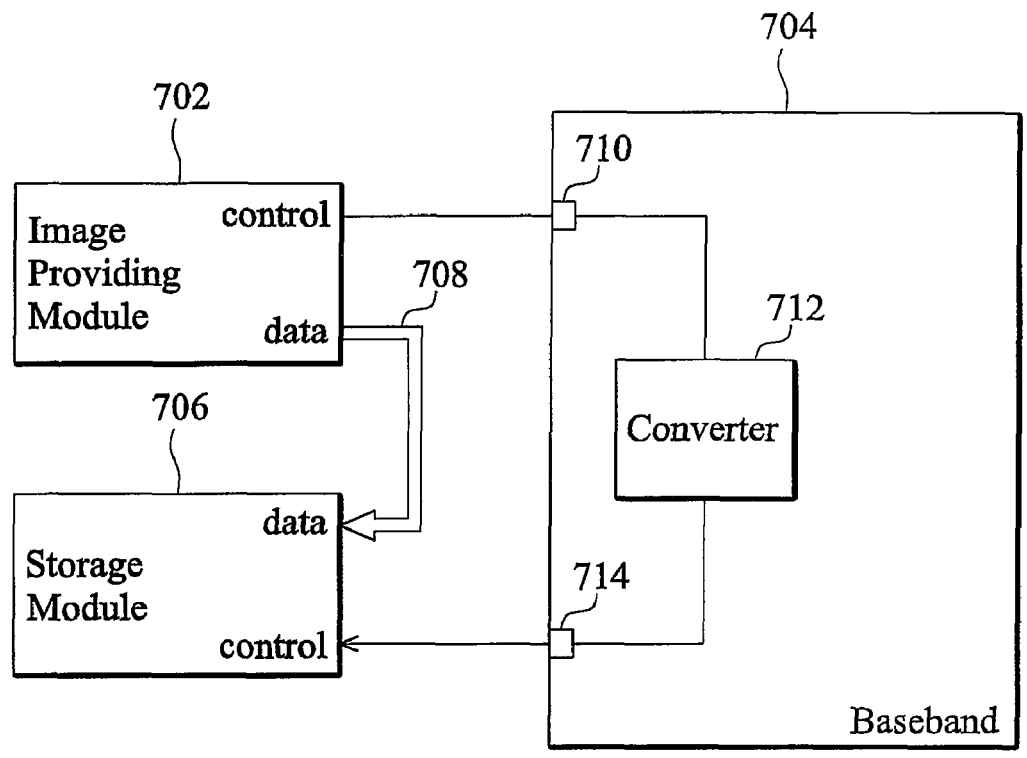
FIG. 7 is a diagram of an embodiment of hardware architecture for integrating an image providing module and a nonvolatile/volatile storage module in a mobile phone according to the invention.

FIG. 7 is a diagram of an embodiment of hardware architecture for integrating an image providing module and a non-volatile/volatile storage module in a mobile phone according to the invention. The mobile phone 700 may comprise an image providing module 702, a baseband chip 704, and a storage module 706. The image providing module 702 may be an ADC or an ISP of a camera module, which can generate image data (i.e. pixel data) and corresponding control signals. The image providing module 702 may generate control signals such as a horizontal sync (HSYNC) signal used to indicate valid pixel data of a frame line and a pixel clock (PXL_CLK) used to synchronize data transmission of the pixel data. A data terminal of the image providing module 702 is directly connected to a data terminal of the storage module 706 via a data bus 708, so as to directly transmit the image data from the image providing module 702 to the storage module 706. It should be noted that the image data is transmitted from the image providing module 702 to the storage module 706 without any data format conversion. The image data format may be an RGB format, a YUV (or YCbCr) format, an index column (or palette) format, or any other color format. The baseband chip 704 may comprise a first I/O pin 710, a converter 712, and a second I/O pin 714. The converter 712 may receive the control signals issued from the image providing module 702 via the first I/O pin 710, convert the received control signals into control signals recognized by the storage module 706, and then issue the converted control signals to the storage module 706 via the second I/O pin 714. The storage module 706 may comprise a non-volatile storage module, such as a secure digital (SD) card, a memory stick (MS) card, a smart media (SM) card, a compact flash (CF) card, an extreme digital (xD) picture card, or the similar, and a relevant card drive for reading or writing data therefrom or thereto. The storage module 706 may also be a volatile storage module, such as a dynamic random access memory (DRAM), a synchronous dynamic random access memory (SDRAM), a static random access memory (SRAM), or the similar. The converted control signals may be a clock (CLK) signal used to enable the storage module 706 to latch on to the pixel data on the data bus 708 to store the pixel data.

Figure 8:
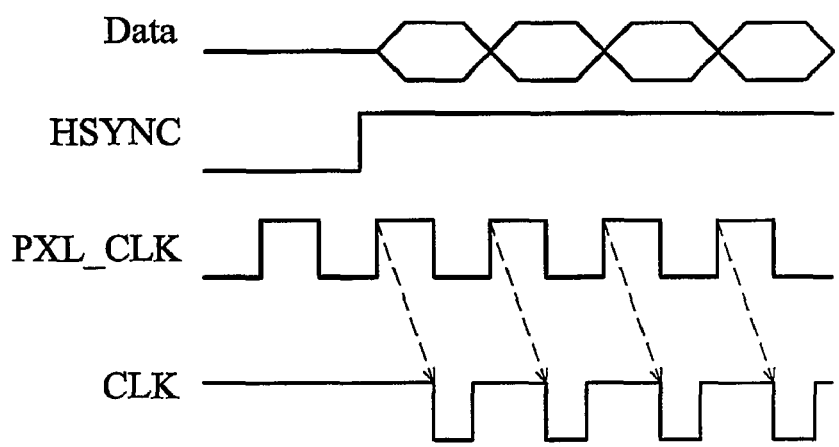
FIG. 8 shows exemplary control signal conversion between the image providing module and the storage module in FIG. 7.

FIG. 8 shows exemplary control signal conversion between the image providing module 702 and the storage module 706 in FIG. 7. Control signals HSYNC and PXL_CLK issued from the image providing module 702 is simply converted into a clock signal CLK to the storage module 706. When the converter 712 detects that the signal HSYNC is at an active high (representing that pixel data of a frame line is being sent on the data bus 708) and the pixel clock PXL_CLK from the image providing module 702 is present, the converter 712 may generate and output the clock signals CLK to the storage module 706 and each clock signal CLK is within its corresponding pixel clock period, where the pixel clock period may be between two adjacent risings or failings of PXL_CLK depending on system requirements. Each clock signal CLK may be started later than a start of its corresponding pixel clock period. Moreover, the pixel data from the image providing module 702 is simultaneously output to the data terminal of the storage module 706 in order to store the images in the storage module 706. When a falling edge of the clock signal CLK is detected, the storage module 706 latches on to the pixel data on the data bus 708 to store the pixel data in the storage module 706. On the contrary, those skilled in the art will appreciate that the storage module 706 may latch on to the pixel data on the data bus 708 to store the pixel data when a rising edge of the clock signal CLK is detected.

While the invention has been described by way of examples and in terms of preferred embodiments, it is to be understood that the invention is not limited thereto. Any variation or modification can be made by those skilled in art without departing from the spirit or scope of the invention. Therefore, the scope of the appended claims should be accorded the broadest interpretation to encompass all such modifications and similar arrangements.

What is claimed is:

1. An electronic device, comprising:
a transmitter configured to transmit data and a control signal;
a converter configured to receive the control signal from the transmitter via a first control signal line and convert the control signal; and
a receiver configured to receive the data from the transmitter via a data bus isolated from the converter and receive the converted control signal from the converter via a second control signal line, wherein the data transmitted from the transmitter is directly electrically connected to the receiver, and the data bus is disconnected from the first and second control signal lines.

2. The electronic device as claimed in claim 1, wherein the transmitter is an image providing module and the data is image data.

3. The electronic device as claimed in claim 2, wherein the data format of the image data is an RGB format, a YUV format, or an index column format.

4. The electronic device as claimed in claim 2, wherein the control signal comprises a horizontal sync signal used to indicate whether a frame line of the image data is being sent or a pixel clock signal used to synchronize data transmission of the image data.

5. The electronic device as claimed in claim 1, wherein the receiver is a liquid crystal display (LCD) module.

6. The electronic device as claimed in claim 5, wherein the converted control signal comprises a chip selection signal used to enable the LCD module to latch on to pixel data or a write strobe signal used to enable the LCD module to store the pixel data.

7. The electronic device as claimed in claim 1, wherein the receiver is a non-volatile storage module, and the converted control signal comprises a clock signal used to enable the non-volatile storage module to store image data.

8. The electronic device as claimed in claim 7, wherein the non-volatile storage module comprises a secure digital (SD) card, a memory stick (MS) card, a smart media (SM) card, a compact flash (CF) card, or an extreme digital (xD) picture card.

9. The electronic device as claimed in claim 1, wherein the receiver is a volatile storage module, and the converted control signal comprises a clock signal, wherein the clock signal is used to enable the volatile storage module to store image data.

10. The electronic device as claimed in claim 9, wherein the volatile storage module is a dynamic random access memory, a synchronous dynamic random access memory, or a static random access memory.

11. An electronic device, comprising:
a transmitter configured to transmit data and a control signal;
an integrated chip, comprising a converter, a first I/O pin, and a second I/O pin, configured to receive the control signal from the transmitter via the first I/O pin over a first control signal line and convert the control signal; and
a receiver configured to receive the data from the transmitter via a data bus on the outside of the integrated chip and receive the converted control signal from the converter via the second I/O pin over a second control signal line, wherein the data bus is disconnected from the first and second control signal lines.

12. The electronic device as claimed in claim 11, wherein the transmitter is an image providing module and the receiver is a liquid crystal display (LCD) module.

13. The electronic device as claimed in claim 12, wherein the data is image data, and the control signal comprises a horizontal sync signal used to indicate whether a frame line of the image data is being sent or a pixel clock signal used to synchronize data transmission of the image data.

14. The electronic device as claimed in claim 13, wherein the converted control signal comprises a chip selection signal used to enable the LCD module to latch on to pixel data or a write strobe signal used to enable the LCD module to store the pixel data.

15. The electronic device as claimed in claim 14, wherein when detecting the horizontal sync signal and the pixel clock signal the converter generates and outputs the chip selection signal and the write strobe signal.

16. The electronic device as claimed in claim 15, wherein each of the generated chip selection signal and the write strobe signal is within its corresponding pixel clock period.

17. The electronic device as claimed in claim 16, wherein each of the generated chip selection signal and the write strobe signal is started later than a start of its corresponding pixel clock period.

18. The electronic device as claimed in claim 11, wherein the data is transmitted from the transmitter to the receiver via the data bus without format conversion.

19. The electronic device as claimed in claim 11, wherein the transmitter is an image providing module and the receiver is a non-volatile or volatile storage module.

20. The electronic device as claimed in claim 19, wherein the data is image data, and the control signal comprises a horizontal sync signal used to indicate whether a frame line of the image data is being sent or a pixel clock signal used to synchronize data transmission of the image data.

21. The electronic device as claimed in claim 20, wherein the converted control signal comprises a clock signal used to enable the volatile storage module to store the image data.

22. The electronic device as claimed in claim 21, wherein when detecting the horizontal sync signal and the pixel clock signal the converter generates and outputs the clock signal.

23. The electronic device as claimed in claim 22, wherein each of the generated clock signal is within its corresponding pixel clock period.

24. The electronic device as claimed in claim 23, wherein each of the generated clock signal is started later than a start of its corresponding pixel clock period.

25. The electronic device as claimed in claim 11, wherein a data terminal of the transmitter is directly electrically connected to a data terminal of the receiver through the data bus.

* * * * *